(12) United States Patent
Bentley

(10) Patent No.: US 6,352,211 B1
(45) Date of Patent: Mar. 5, 2002

(54) FLOW BLOCKING EXHAUST NOZZLE

(75) Inventor: David Todd Bentley, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/684,095

(22) Filed: Oct. 6, 2000

(51) Int. Cl.$^7$ .................................................. B64C 9/38

(52) U.S. Cl. .................................... 239/265.37; 60/229

(58) Field of Search ....................... 60/229; 239/265.37, 239/265.39

(56) References Cited

U.S. PATENT DOCUMENTS 5,016,818 A * 5/1991 Nash ...................... 239/127.1

OTHER PUBLICATIONS

Chart entitled HSCT Convergent–Divergent Hinge Definition, (1995).

* cited by examiner

Primary Examiner—Charles G. Freay
Assistant Examiner—Ehud Gartenberg
(74) Attorney, Agent, or Firm—Andrew C. Hess; Rodney M. Young

(57) ABSTRACT

An exhaust nozzle for an aircraft engine. The nozzle includes a mount for attaching the exhaust nozzle to a downstream end of the engine and first and second opposed upstream flaps moveably connected to the mount having inner surfaces defining an upstream exhaust gas flowpath. Each upstream flap extends between an upstream end and a downstream end and is moveable relative to the mount between an open position in which the downstream ends of the upstream flaps are spaced by a first distance, and a closed position in which the downstream ends touch to substantially block flow through the exhaust gas flowpath. First and second opposed downstream flaps are moveably connected to the first and second upstream flaps having inner surfaces defining a downstream exhaust gas flowpath.

10 Claims, 7 Drawing Sheets

FLOW BLOCKING EXHAUST NOZZLE

BACKGROUND OF THE INVENTION

The present invention relates generally to exhaust systems for aircraft gas turbine engines, and in particular to an exhaust nozzle capable of completely blocking flow of exhaust gas.

Advanced short takeoff and vertical landing (STOVL) aircraft must operate effectively over a wide range of flight conditions, including conventional forward flight and vertical or hovering flight. Those conditions impose special requirements on exhaust nozzles. In forward flight, a nozzle must efficiently accelerate high pressure exhaust gas in a generally horizontal direction to generate forward thrust as the gas exits from an aft end of the aircraft. In vertical flight, the nozzle should prevent exhaust gas from exiting horizontally, instead directing it vertically downward to generate lift.

The nozzle typically includes flaps defining a convergent upstream duct leading to a plane of minimum flow area known as a throat, and a divergent downstream duct extending from the throat to an exit. The nozzle also includes a mechanism for moving the flaps so that the throat and exit may be varied in size to provide for efficient engine operation at all engine power settings, flight speeds, and altitudes. The flaps are constructed to withstand exposure to high pressure and high temperature exhaust gas in a highly vibratory environment. Most nozzle flaps have a liner, a thin metallic shell designed to tolerate high temperatures extending parallel to and adjacent the flap. A layer of cooling air is typically provided between the liner and the flap. The liner may include one or more coating of a material that reduces radar or infrared visibility or enhances the thermal protection of the liner.

Current exhaust nozzles have not been capable of completely preventing all exhaust flow from exiting through the nozzle. Conventional flaps cannot close the nozzle without causing damage because the liners, coatings, and flap structures are typically fragile and easily broken. Any leakage of exhaust gas through the nozzle reduces potential lift and degrades aircraft performance and payload. Therefore, it is critical that all exhaust gas be blocked. Consequently, some aircraft have a separate blocker device, such as a deployable clamshell, in the exhaust system to completely block flow. These devices add substantial weight and complexity to the exhaust system.

SUMMARY OF THE INVENTION

In general, an exhaust nozzle of the present invention is for an aircraft engine. The nozzle comprises a mount for attaching the exhaust nozzle to a downstream end of the engine, and first and second opposed upstream flaps moveably connected to the mount having inner surfaces defining an upstream exhaust gas flowpath. Each upstream flap extends between an upstream end and a downstream end and is moveable relative to the mount between an open position in which the downstream ends of the upstream flaps are spaced by a first distance, and a closed position in which the downstream ends touch to substantially block flow through the exhaust gas towpath. First and second opposed downstream flaps are moveably connected to the first and second upstream flaps. The downstream flaps have inner surfaces defining a downstream exhaust gas flowpath.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
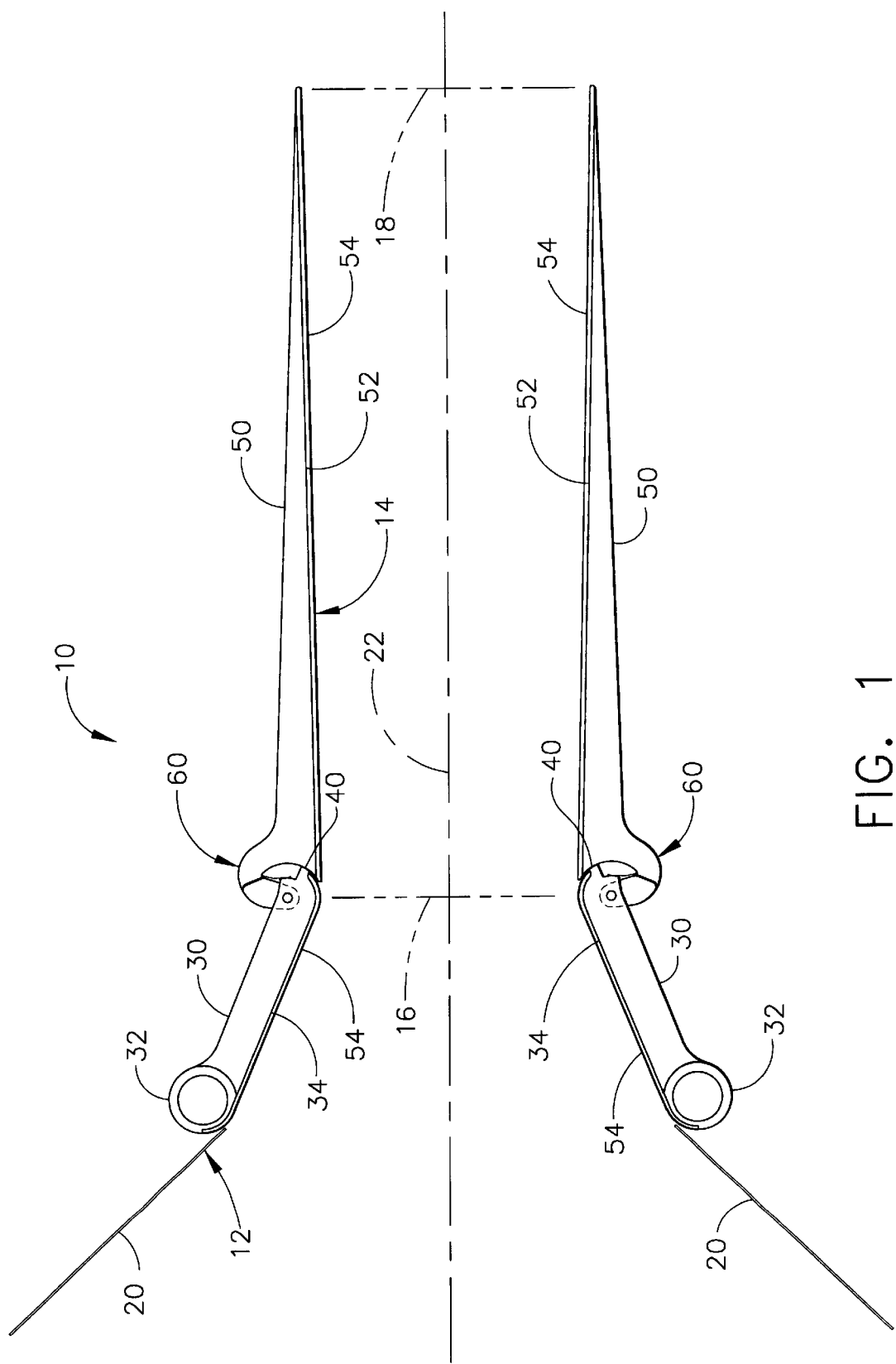
FIG. 1 is a schematic side elevational section of an exhaust nozzle according to the present invention in an open position.

Referring now to the drawings and in particular to FIG. 1, an exhaust nozzle for an aircraft gas turbine engine is designated in its entirety by the reference number 10. The nozzle 10 defines a flowpath for engine exhaust gas which exits generally horizontally from an aft end of an aircraft (not shown). The present invention is particularly adapted for nozzles having a generally rectangularly-shaped flowpath and generally uniform sections across a width of the nozzle. Such nozzles are known as "two-dimensional convergent-divergent (2-D C-D) nozzles". The description will primarily refer to this application. However, it should be understood that the invention can be used with other nozzle types having a variety of sectional shapes without departing from the scope of this invention.

The nozzle 10 includes a converging duct indicated generally at 12 defining an upstream boundary of exhaust gas flow. The nozzle 10 further includes a diverging duct indicated generally at 14 defining a downstream boundary of exhaust gas flow. The diverging duct 14 is located downstream from the converging duct 12. As gas moves downstream through the nozzle 10, a cross-sectional area available for gas flow usually decreases in the converging duct 12 and increases in the diverging duct 14. A plane of minimum cross-sectional area, known as a "throat" 16, is located between the converging duct 12 and the diverging duct 14. For normal operation of the nozzle 10 (i.e., choked and fill flowing conditions), exhaust gas accelerates through the converging duct 12 to a sonic velocity (Mach 1.0) at the throat 16 and continues accelerating through the diverging duct 14 to a supersonic velocity (greater than Mach 1.0) at an exit 18 of the nozzle. Flow properties will vary depending upon the cross-sectional areas of the throat 16 and exit 18 and the initial exhaust gas pressure, temperature, and quantity.

The exhaust nozzle 10 includes a mount 20 for attaching the nozzle to a downstream end of the engine (not shown). Preferably, the mount 20 comprises a transition duct which extends from the downstream end of the engine to an upstream end of the converging duct 12. The transition duct alters a cross sectional shape of the flowpath from generally circular at the engine to generally rectangular at the converging duct 12. A reference centerline 22 is shown at the center of the nozzle 10.

The converging duct 12 includes first and second opposed upstream, convergent flaps 30 moveably connected to the mount 20. Preferably, the convergent flaps 30 are attached at pivots 32 to a downstream end of the mount 20. The flaps 30 are moved to selected positions by a conventional control system including hydraulic or electric actuators (not shown). Each flap 30 extends between an upstream end at the pivot 32 and a downstream end located near to the nozzle throat 16. Inner surfaces 34 of the flaps 30 define an upstream exhaust gas flowpath. The inner surfaces 34 are generally planar and are contoured at the ends of the flaps 30 where they meet adjacent structure at the mount 20 and at the diverging duct 14. The contoured ends of the flaps 30 provide a smooth flowpath at the junctures without any steps or gaps that would interrupt smooth continuous flow and potentially degrade thrust performance. Flaps 30 having non-planar configurations or other end contours do not depart from the scope of this invention.

The first and second opposed convergent flaps 30 are pivotable relative to the mount 20 to adjust the size of the nozzle throat 16 defined by the downstream ends of the flaps 30. The flaps 30 are moveable to an open position shown in FIG. 1, typically used during forward flight of the aircraft, wherein exhaust gas may flow through the nozzle 10. As will be appreciated by those skilled in the art, the distance between the downstream ends of the flaps 30 is adjustable over a range as required for proper operation of the engine at a particular flight condition and power setting. As discussed below, the flaps 30 are moveable to a closed position shown in FIG. 4 in which protrusions 40 on the downstream ends of the flaps touch to substantially block flow through the exhaust gas flowpath.

Figure 2:
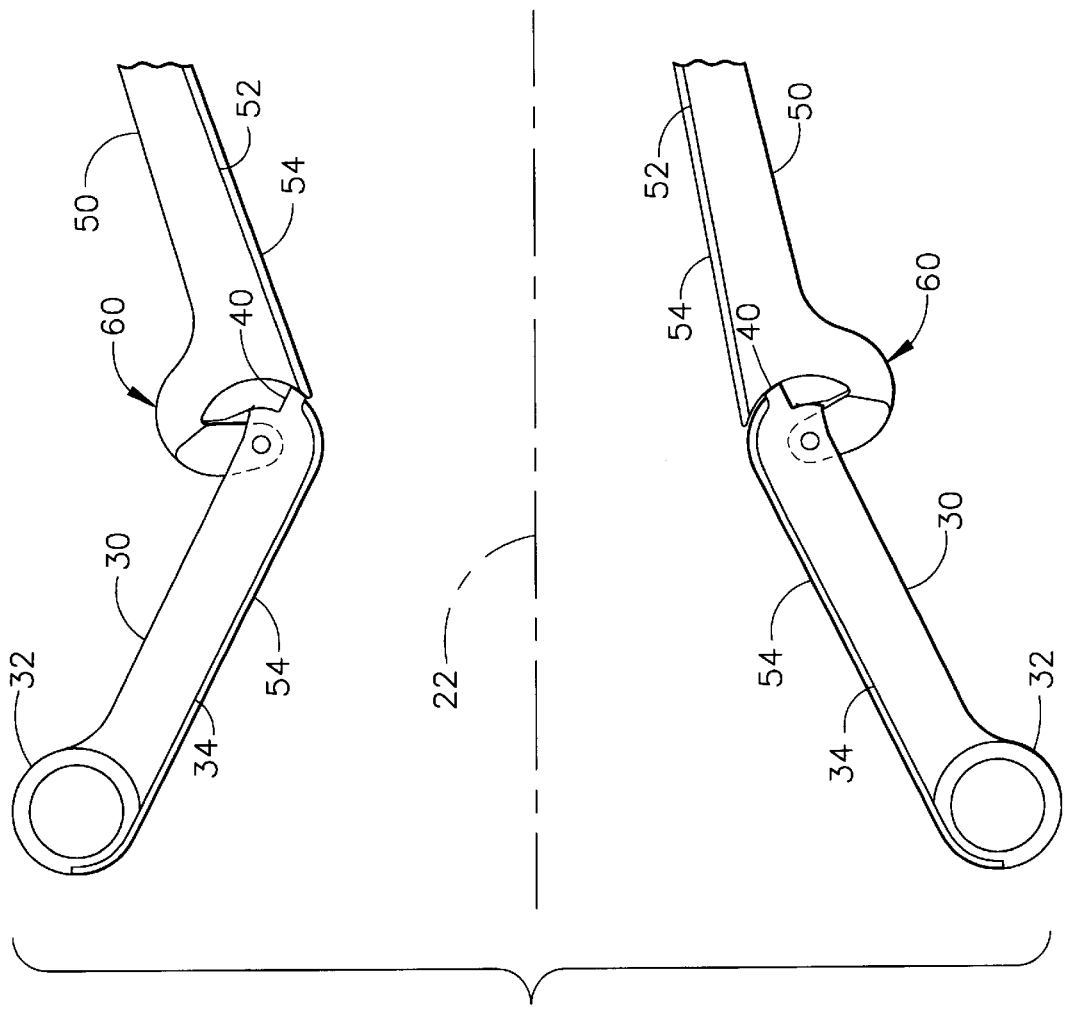
FIG. 2 is an enlarged schematic side elevational section of a portion of the nozzle in an upward thrust vectoring position.

The diverging duct 14 includes first and second opposed downstream divergent flaps 50 that are pivotably connected to the first and second upstream convergent flaps 30, respectively. Inner surfaces 52 of the divergent flaps 50 define a downstream exhaust gas flowpath. Preferably, the inner surfaces 52 are flat, although flaps 50 having non-flat contours may be used without departing from the scope of this invention. The divergent flaps 50 are moveable for both altering cross-sectional areas and for turning or vectoring the flow, as shown in FIG. 2 where the nozzle 10 is in a thrust vectoring position.

A liner 54 is provided on the inner surfaces 34 and 52 of the flaps 30, 50, although it should be understood that the liner may be omitted without departing from the scope of the present invention. The liner may have one or more coatings (not shown) of a material for reducing radar or infrared visibility or enhancing thermal protection of the liner. The liner 54 along the divergent flaps 50 may be easily removed and re-installed for maintenance purposes because it is flat and without contoured ends.

A sidewall (not shown) is positioned along each side of the nozzle 10 to contain flow within the converging and diverging ducts, 12 and 14, respectively. Preferably, the sidewalls have inner surfaces which are solid, flat, and oriented to form a generally rectangularly-shaped flowpath along an entire length of the ducts 12, 14 when engaged by the convergent and divergent flaps, 30 and 50, respectively. However, the sidewalls may have a variety of shapes, lengths, or vented (i.e., non-solid) configurations without departing from the scope of this invention.

Figure 3:
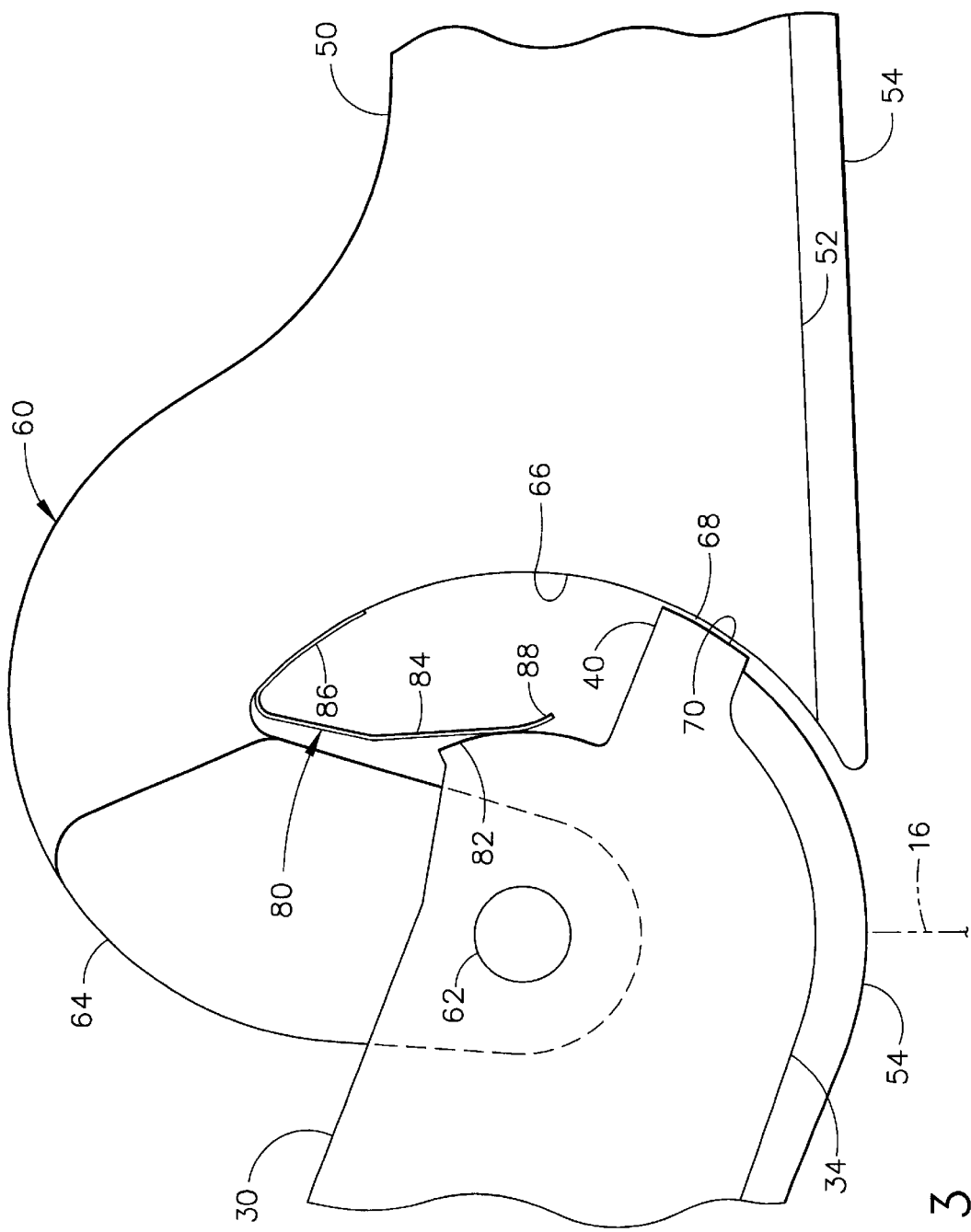
FIG. 3 is an enlarged view of a hinged joint of the nozzle in the open position.

A hinged junction, or joint, indicated generally at 60, connects each upstream, convergent flap 30 to a corresponding downstream, divergent flap 50. Referring to FIG. 3, the joint 60 includes a hinge pin 62 that extends through aligned holes in the convergent and divergent flaps. The downstream end of the convergent flap 30 and the upstream end of the divergent flap 50 are formed for being pivotally connected to permit relative angular motion between the flaps. The divergent flap 50 has a hook-shaped connector 64 with one or more lugs on an end of the connector that form a clevis-type attachment with the convergent flap 30. The flow side inner surface 34 of the convergent flap 30 curves around the hinge pin 62. The convergent flap 30 has the protrusion 40 extending from the aft end. The divergent flap 50 has an arcuate, concave shaped surface 66 forming a guideway centered at the hinge pin for accommodating the protrusion 40. As the flaps are moved relative to each other, the protrusion 40 moves within the guideway so a narrow gap 68 is formed between the surface 66 and a tip 70 of the protrusion.

Figure 4:
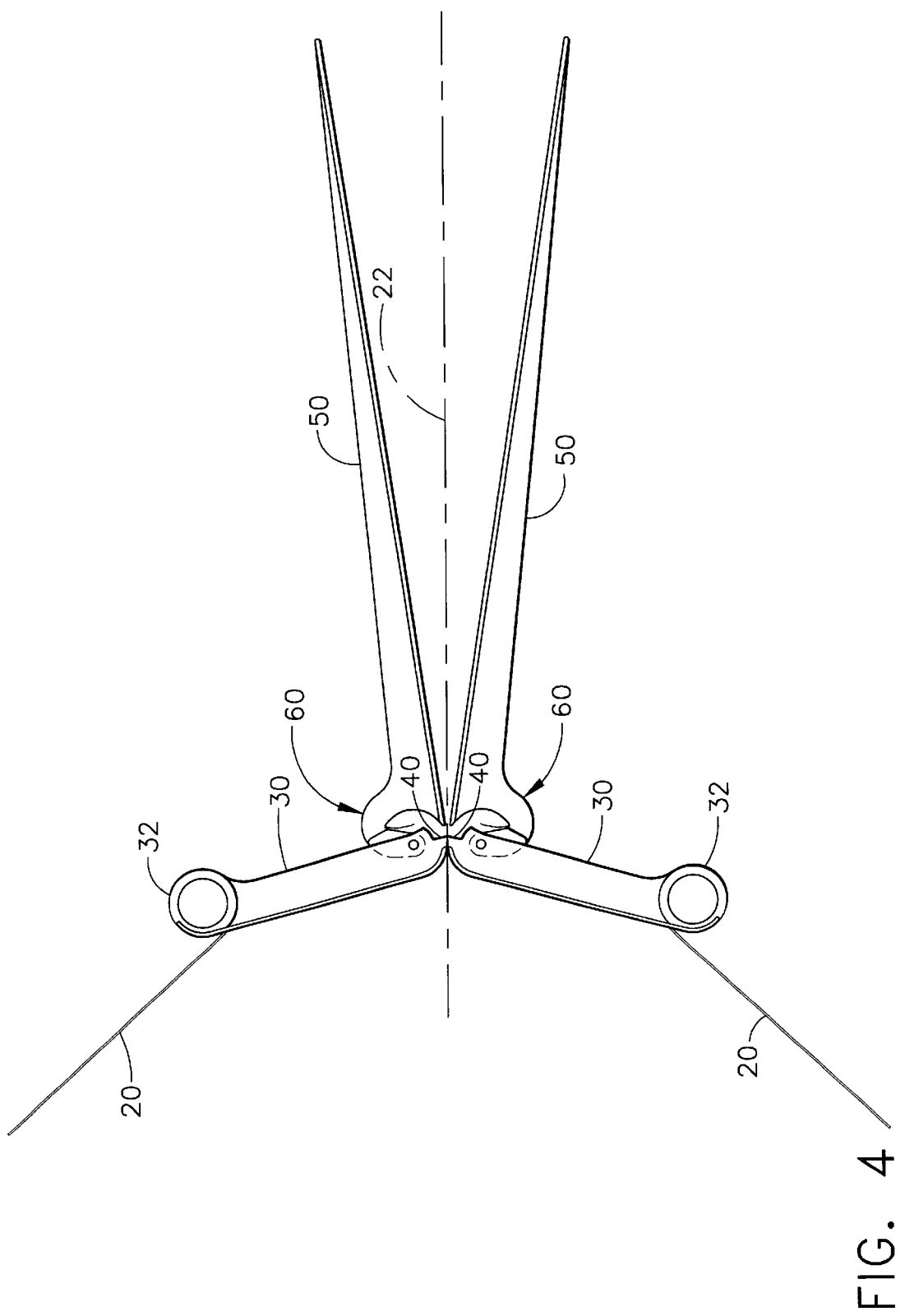
FIG. 4 is a schematic side elevational section of the exhaust nozzle in a closed position.
Figure 5:
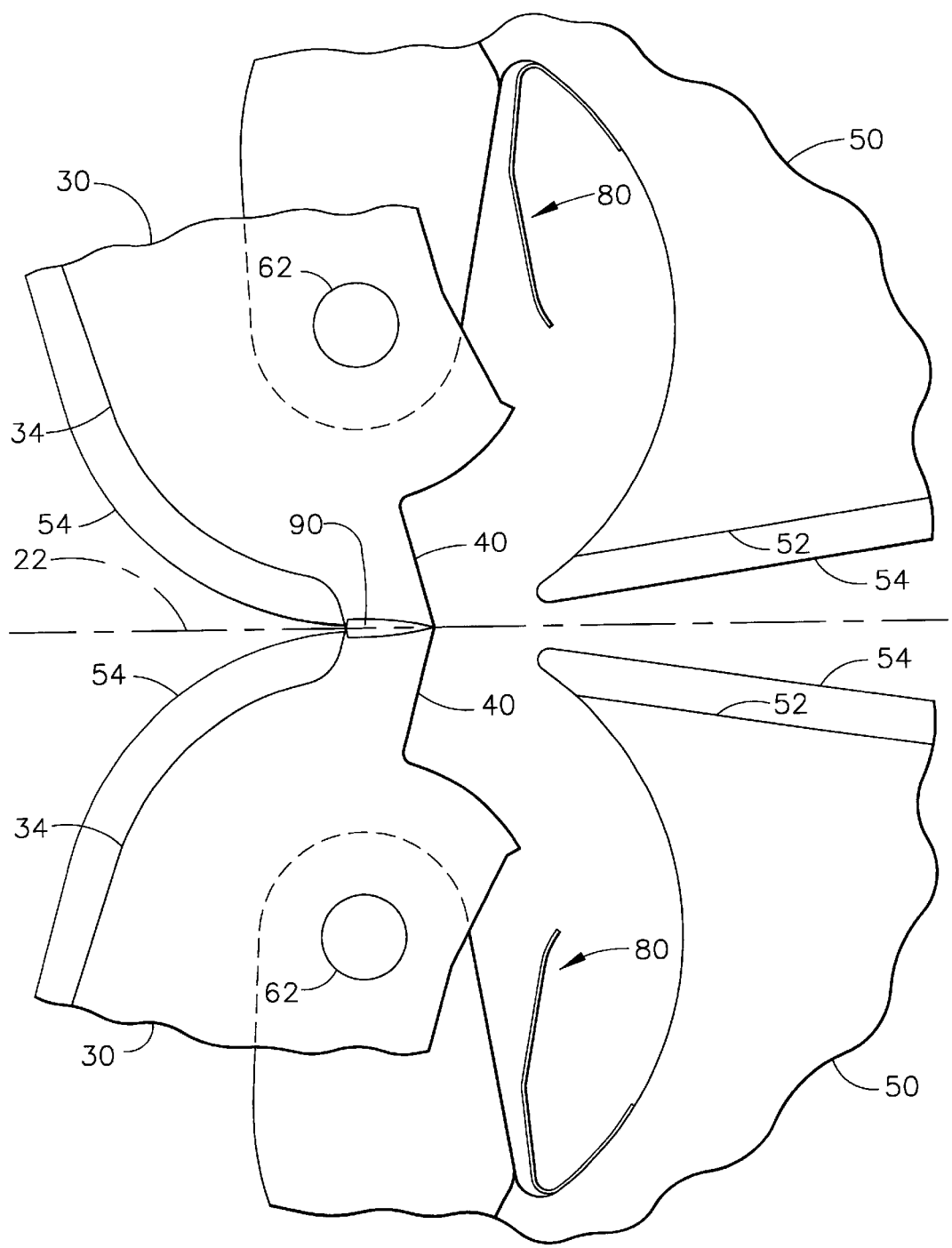
FIG. 5 is a detail of a portion of FIG. 4 showing sealingly engaged flap protrusions.

A seal indicated generally at 80 is positioned in the joint 60 for preventing exhaust gas from leaking through the gap 68 between the convergent flap 30 and the divergent flap 50. Exhaust gas tends to leak from the flow stream to a flap cavity between the flaps and an external moldline because the flowpath pressure is higher than pressure outside the nozzle 10. Exhaust gas leakage reduces thrust performance of the nozzle. The seal 80 is shaped to simultaneously engage the concave surface 66 of the divergent flap 50 and a shoulder 82 on the convergent flap 30. The seal 80 has first and second legs, 84 and 86, respectively. The second leg 86 is attached to the surface 66. The first leg 84 is slidable along the shoulder 82 to provide a seal while not impeding rotational motion of the flaps about the hinge pin 62. The first leg 84 has an upturned tip 88 adapted for engaging the shoulder 82 and returning the seal 80 to a proper operating position after the flaps have been rotated to a closed position, as shown in FIGS. 4 and 5, where the first leg becomes disengaged from the shoulder. The seal 80 is formed of a resiliently compliant material suitable for slidably engaging and sealing against the concave surface 66 even at high temperatures, such as a sheet metal (e.g., a nickel alloy such as INCONEL alloy, a registered trademark of Inco Alloys International, Inc. of Huntington, W. Va.).

Significantly, the seal 80 is positioned downstream from the throat 16 so it is exposed to lower exhaust gas pressures than it would be at locations upstream from the throat. That permits the seal 80 to be lighter, more effective, and more reliable because the pressure differential across the seal is less than for seals located upstream from the throat 16. The seal 80 is located where it can be installed and removed from the nozzle 10 without removing other parts of the nozzle. Thus, the seal 80 is easily replaced if it becomes damaged. Seals having other configurations may be used without departing from the scope of this invention.

Each protrusion 40 is sized and positioned so that it is outside the upstream boundary of exhaust gas flow and the downstream boundary of exhaust gas flow when the convergent flaps 30 are in the open position. As shown in FIGS. 1–3, the protrusion 40 is generally concealed, or stowed, in the guideway when the flaps are positioned for forward flight. At these positions, the protrusion 40 is protected and it is not visible to external radar sensors.

When the convergent flaps 30 are moved to the closed position, as shown in FIGS. 4 and 5, the protrusions 40 are exposed, or deployed. The opposing protrusions 40 function as blocking members, engaging each other in a generally airtight manner to substantially block flow through the exhaust gas flowpath. The tips 70 of each protrusion which engage the opposing protrusion may be bare metal, formed of the same material as the flap structure, or may be covered with a pad of material suitable for sealing. The contact between the protrusions 40 is a sole point of engagement between the first and second upstream, convergent flaps 30 when the upstream flaps are in the closed position. The flaps, liners 54, and coatings do not contact any other structure, thus precluding any damage. The opposing protrusions 40 are sized to engage each other at contact region 90 (FIG. 5) forming an interference fit against one another when the nozzle 10 is in the closed position. The interference fit helps ensure that the protrusions 40 are pressed tightly against one another to effectively seal the nozzle shut.

As will be appreciated by those skilled in the art, the protrusions 40 may extend from the downstream, divergent flaps 50, instead of from the convergent flaps 30, without departing from the scope of this invention. Further, the protrusions 40 may have substantially any shape so long as they generally form a seal against each other.

Figure 6:
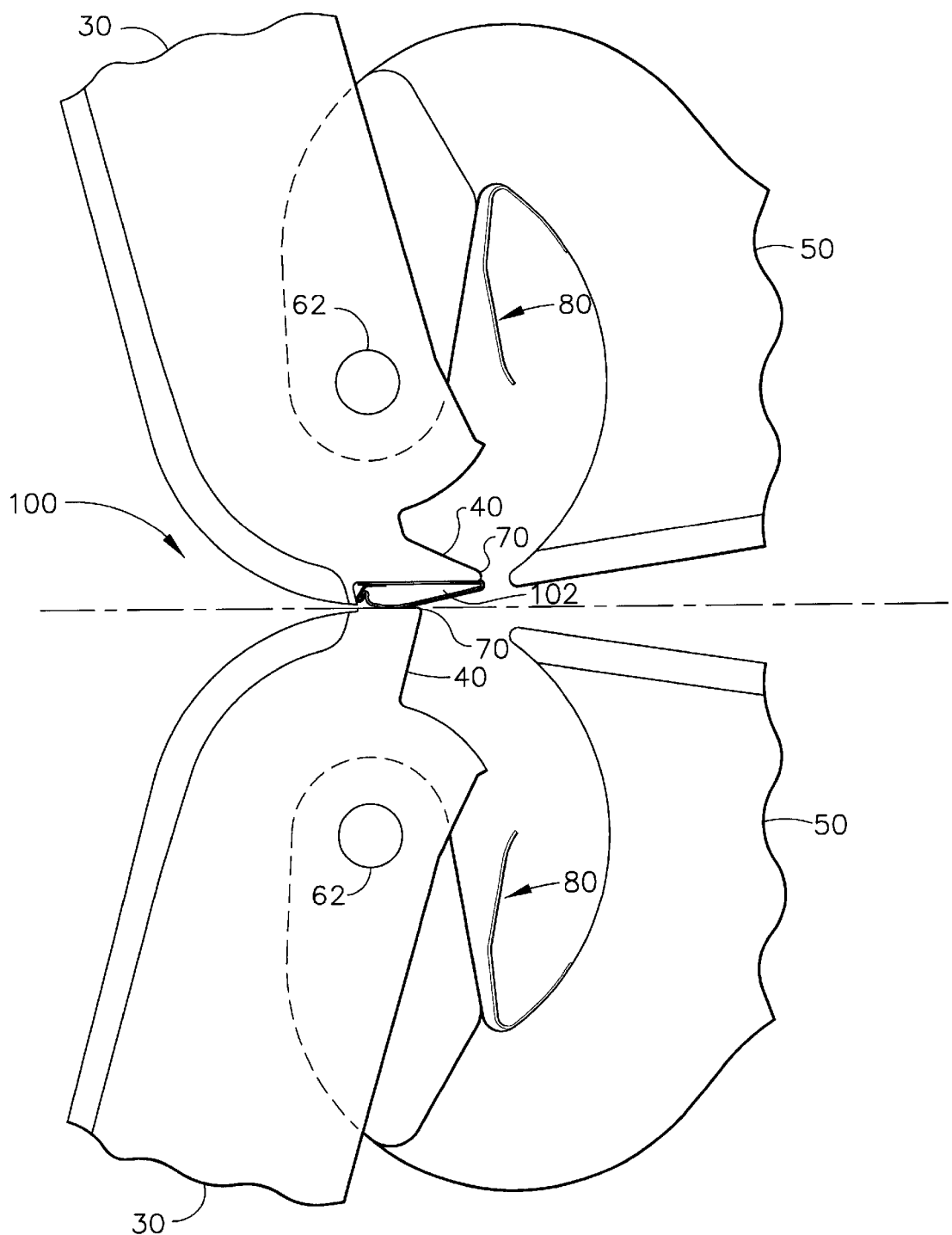
FIG. 6 is a detail of a second embodiment of the present invention.

FIG. 6 illustrates a second embodiment 100 of the invention in which a seal 102 is mounted on the tip 70 of one of the opposing protrusions 40. When the flaps are moved to the closed position, the seal 102 resiliently deforms as it engages the opposite protrusion 40 to form a generally airtight seal. The seal 102 is formed of a resiliently compliant material suitable for sealing against the opposite protrusion 40 even at high temperatures, such as a sheet metal (e.g., a nickel alloy such as INCONEL). A second seal 102 could also be mounted on the tip 70 of the opposite protrusion. Although the seal 102 shown in FIG. 6 is a constrained leaf seal design, other seal configurations for sealing against an opposing protrusion 40 may be used without departing from the scope of this invention.

Figure 7:
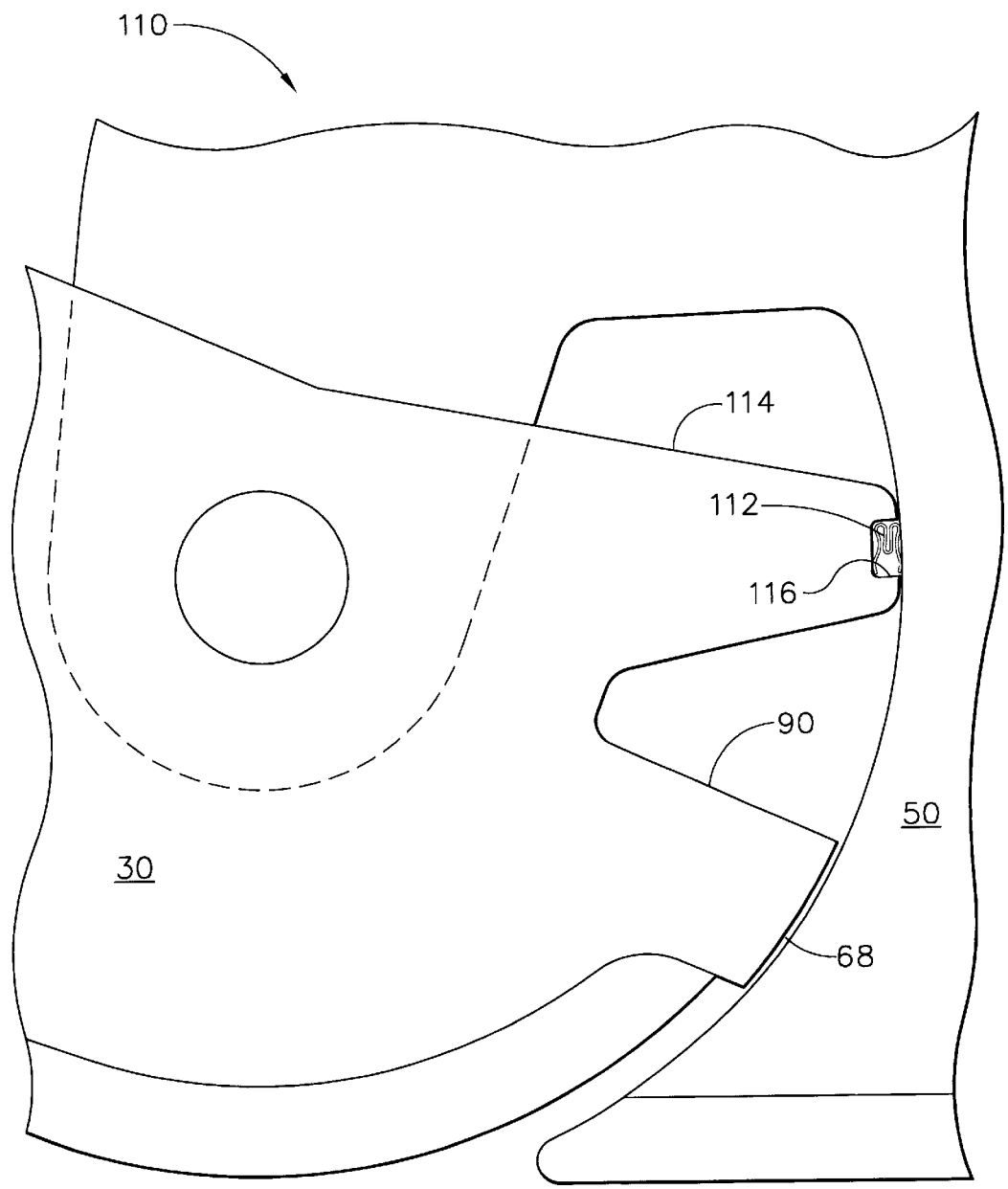
FIG. 7 is a detail of a third embodiment of the present invention.

A third embodiment 110 of the invention, shown in FIG. 7, includes a seal 112 mounted on the downstream end of the convergent flap 30. The seal 112 prevents exhaust gas from leaking through the gap 68 between the convergent flap 30 and the divergent flap 50. The convergent flap 30 of the third embodiment 110 has a second protrusion 114 on the downstream end. The second protrusion 114 has a cavity 116 at its tip in which the resiliently compliant seal 112 is placed. The seal 112 is formed of a resiliently compliant material suitable for slidably engaging and sealing against the concave surface 66 even at high temperatures, such as a sheet metal (e.g., a nickel alloy such as INCONEL alloy). The seal 112 is of a conventional design, formed generally in the shape of a letter W or E. One advantage of the third embodiment 110 is that the seal 112 is accessible through the aft end of the nozzle 10, and it can be installed and removed without removing or disassembling other parts of the nozzle.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An exhaust nozzle for an aircraft engine comprising:
    a mount for attaching the exhaust nozzle to a downstream end of the engine;
    first and second opposed upstream flaps moveably connected to the mount having inner surfaces defining an upstream exhaust gas flowpath, each upstream flap extending between an upstream end and a downstream end and being moveable relative to the mount between an open position in which the downstream ends of the upstream flaps are spaced by a first distance, and a closed position in which said downstream ends touch to substantially block flow through said exhaust gas flowpath; and
    first and second opposed downstream flaps moveably connected to said first and second upstream flaps and having inner surfaces defining a downstream exhaust gas flowpath.

2. An exhaust nozzle as set forth in claim 1 wherein the upstream and downstream flaps are connected at a junction, at least two of said flaps having protrusions thereon at said junction, said protrusions being sized and positioned to touch when said upstream flaps are in said closed position to substantially block flow through said upstream and downstream exhaust gas flowpaths.

3. An exhaust nozzle as set forth in claim 2 wherein the protrusions are sized and positioned so that they are outside the upstream exhaust gas flowpath and the downstream exhaust gas flowpath when the upstream flaps are in the open position.

4. An exhaust nozzle as set forth in claim 2 wherein said first and second upstream flaps are engageable only at said protrusions when the upstream flaps are in the closed position.

5. An exhaust nozzle as set forth in claim 2 wherein said protrusions extend from the downstream ends of each of the upstream flaps.

6. An exhaust nozzle as set forth in claim 5 wherein each of said downstream flaps has an internal guideway at its upstream end for receiving said protrusion extending from the corresponding upstream flap when the upstream flaps are in the open position.

7. An exhaust nozzle as set forth in claim 6 wherein said guideway is arcuate.

8. An exhaust nozzle as set forth in claim 1 further comprising a seal positioned between said upstream flaps and said downstream flaps for preventing exhaust gas from leaking between said upstream flaps and said downstream flaps.

9. An exhaust nozzle as set forth in claim 1 wherein said upstream flaps are pivotably attached to said mount and said downstream flaps are pivotably attached to said upstream flaps.

10. An exhaust nozzle for an aircraft engine, comprising:
    a converging duct defining a boundary of exhaust gas flow including at least one moveable flap for altering a throat area of the converging duct;
    a diverging duct located downstream from the converging duct including at least one moveable flap pivotally connected at a hinged junction to said converging duct flap; and
    a blocking member mounted on one of said converging duct flap and said diverging duct flap at the hinged junction for selectively blocking flow through the nozzle;
    wherein said converging duct flap and said diverging duct flap are moveable between an open position in which the blocking member is stowed within said junction to permit exhaust gas to flow through the nozzle, and a closed position in which the blocking member is deployed to prevent flow of exhaust gas through the nozzle.

* * * * *